United States Patent
Quinn et al.

(10) Patent No.: US 10,287,918 B2
(45) Date of Patent: May 14, 2019

(54) COMPOSITE ATTACHMENT STRUCTURE WITH 3D WEAVE

(71) Applicant: United Technologies Corporation, Hartford, CT (US)

(72) Inventors: Christoper M. Quinn, Middletown, CT (US); Sreenivasa R. Voleti, Farmington, CT (US)

(73) Assignee: United Technologies Corporation, Farmington, CT (US)

( * ) Notice: Subject to any disclaimer, the term of this patent is extended or adjusted under 35 U.S.C. 154(b) by 466 days.

(21) Appl. No.: 14/436,240

(22) PCT Filed: Feb. 5, 2014

(86) PCT No.: PCT/US2014/014766
§ 371 (c)(1),
(2) Date: Apr. 16, 2015

(87) PCT Pub. No.: WO2014/200571
PCT Pub. Date: Dec. 18, 2014

(65) Prior Publication Data
US 2016/0047275 A1      Feb. 18, 2016

Related U.S. Application Data

(60) Provisional application No. 61/766,388, filed on Feb. 19, 2013.

(51) Int. Cl.
*F01D 9/02* (2006.01)
*F01D 25/24* (2006.01)
(Continued)

(52) U.S. Cl.
CPC ............ *F01D 25/243* (2013.01); *B29C 70/24* (2013.01); *F01D 9/02* (2013.01); *F01D 25/28* (2013.01);
(Continued)

(58) Field of Classification Search
CPC ........ F01D 25/24; F01D 25/243; F01D 25/28; B29C 70/24; F02C 7/20; F02K 1/80;
(Continued)

(56) References Cited

U.S. PATENT DOCUMENTS 4,468,210 A  *  8/1984  McCutchan, Jr. ...... F16H 55/44
                                                              474/170
5,350,136 A     9/1994  Prosser et al.
(Continued)

FOREIGN PATENT DOCUMENTS

EP      2202153 A2    6/2010
EP      2514929 A2   10/2012

OTHER PUBLICATIONS

The PCT International Search Report dated Dec. 24, 2014 for International Application No. PCT/US2014/014766.
(Continued)

*Primary Examiner* — Carlos A Rivera
*Assistant Examiner* — Sang K Kim
(74) *Attorney, Agent, or Firm* — Kinney & Lange, P.A.

(57) ABSTRACT

An attachment structure for a case includes a V-groove defined by first and second arms extending circumferentially around the case and meeting at a lower portion. At least a portion of the attachment structure is a three-dimensionally woven composite.

12 Claims, 3 Drawing Sheets

(51) Int. Cl.
*B29C 70/24* (2006.01)
*F01D 25/28* (2006.01)
*F02K 1/80* (2006.01)
*F02K 3/06* (2006.01)
*F02C 7/20* (2006.01)

(52) U.S. Cl.
CPC ............... *F02C 7/20* (2013.01); *F02K 1/80* (2013.01); *F02K 3/06* (2013.01); F05D 2220/32 (2013.01); F05D 2220/36 (2013.01); F05D 2230/60 (2013.01); F05D 2240/14 (2013.01); F05D 2300/603 (2013.01); F05D 2300/6034 (2013.01); Y02T 50/672 (2013.01)

(58) Field of Classification Search
CPC .... F02K 3/06; F05D 2220/32; F05D 2220/36; F05D 2230/60; F05D 2240/14; F05D 2300/603; F05D 2300/6034
See application file for complete search history.

(56) References Cited

U.S. PATENT DOCUMENTS

| | | | | |
|---|---|---|---|---|
| 5,437,538 | A * | 8/1995 | Mitchell | ............... F01D 21/045 415/200 |
| 7,101,154 | B2 * | 9/2006 | Dambrine | ............... B29C 70/48 29/889.71 |
| 7,435,050 | B2 * | 10/2008 | Welch | ............... F01D 25/243 415/201 |
| 7,563,069 | B2 | 7/2009 | Harper | |
| 7,730,715 | B2 | 6/2010 | Grudnoski et al. | |
| 7,871,486 | B2 | 1/2011 | Xie et al. | |
| 8,038,393 | B2 | 10/2011 | Audeon et al. | |
| 8,307,628 | B2 | 11/2012 | Hoyland | |
| 8,926,277 | B2 * | 1/2015 | Walters | ............... F01D 25/243 415/214.1 |
| 9,109,465 | B2 * | 8/2015 | Gaudry | ............... F01D 25/243 |
| 9,550,340 | B2 * | 1/2017 | Olivier | ............... B29B 11/16 |
| 2003/0056847 | A1 | 3/2003 | Schmidt et al. | |
| 2007/0264128 | A1 | 11/2007 | Grudnoski et al. | |
| 2008/0116334 | A1 | 5/2008 | Xie et al. | |
| 2008/0118683 | A1 * | 5/2008 | Xie | ............... F01D 25/005 428/34.5 |
| 2008/0145215 | A1 * | 6/2008 | Finn | ............... F01D 21/045 415/200 |
| 2008/0200700 | A1 | 8/2008 | Gabetta et al. | |
| 2008/0206048 | A1 | 8/2008 | Coupe et al. | |
| 2009/0200700 | A1 * | 8/2009 | Marlin | ............... B29C 70/32 264/241 |
| 2009/0260344 | A1 | 10/2009 | Hoyland | |
| 2011/0138769 | A1 | 6/2011 | Costa et al. | |
| 2011/0182743 | A1 | 7/2011 | Naik | |
| 2012/0099981 | A1 | 4/2012 | Verseux et al. | |
| 2013/0108422 | A1 * | 5/2013 | Coupe | ............... F01D 25/00 415/182.1 |
| 2013/0224035 | A1 * | 8/2013 | Alexander | ............... F01D 5/282 416/230 |
| 2014/0212273 | A1 * | 7/2014 | Le Borgne | ............... F01D 21/045 415/119 |

OTHER PUBLICATIONS

Extended European Search Reported for EP Application No. 14810173.6 dated Oct. 12, 2016 8 pages.

* cited by examiner

COMPOSITE ATTACHMENT STRUCTURE WITH 3D WEAVE

CROSS-REFERENCE TO RELATED APPLICATION

This application claims priority from U.S. PCT Application No. PCT/US14/14766, filed Feb. 5, 2014 for "COMPOSITE ATTACHMENT STRUCTURE WITH 3D WEAVE" by Christopher M. Quinn and Sreenivasa R. Voleti, and from U.S. Provisional Application No. 61/766,388, filed Feb. 19, 2013 for "COMPOSITE ATTACHMENT STRUCTURE WITH 3D WEAVE" by Christopher M. Quinn and Sreenivasa R. Voleti.

BACKGROUND

Composite materials offer potential design improvements in gas turbine engines. For example, in recent years composite materials have been replacing metals in gas turbine engine components because of their high strength and low weight. Typical composite components can be formed of a plurality of two-dimensional filament reinforced plies or laminations stacked on each other. These can be cut and stacked in a mold. The mold can then be injected with a resin and cured. The strength of the plies is high in the plane of the plies and lowest normal to the plane, through the thickness.

SUMMARY

An attachment structure for a case includes a V-groove defined by first and second arms extending circumferentially around the case and meeting at a lower portion. At least a portion of the attachment structure is a three-dimensionally woven composite.

A method of forming a V-groove for a case includes three-dimensionally weaving at least a portion of an attachment structure; and connecting the attachment structure circumferentially around an end of the fan case.

DETAILED DESCRIPTION

Figure 1:
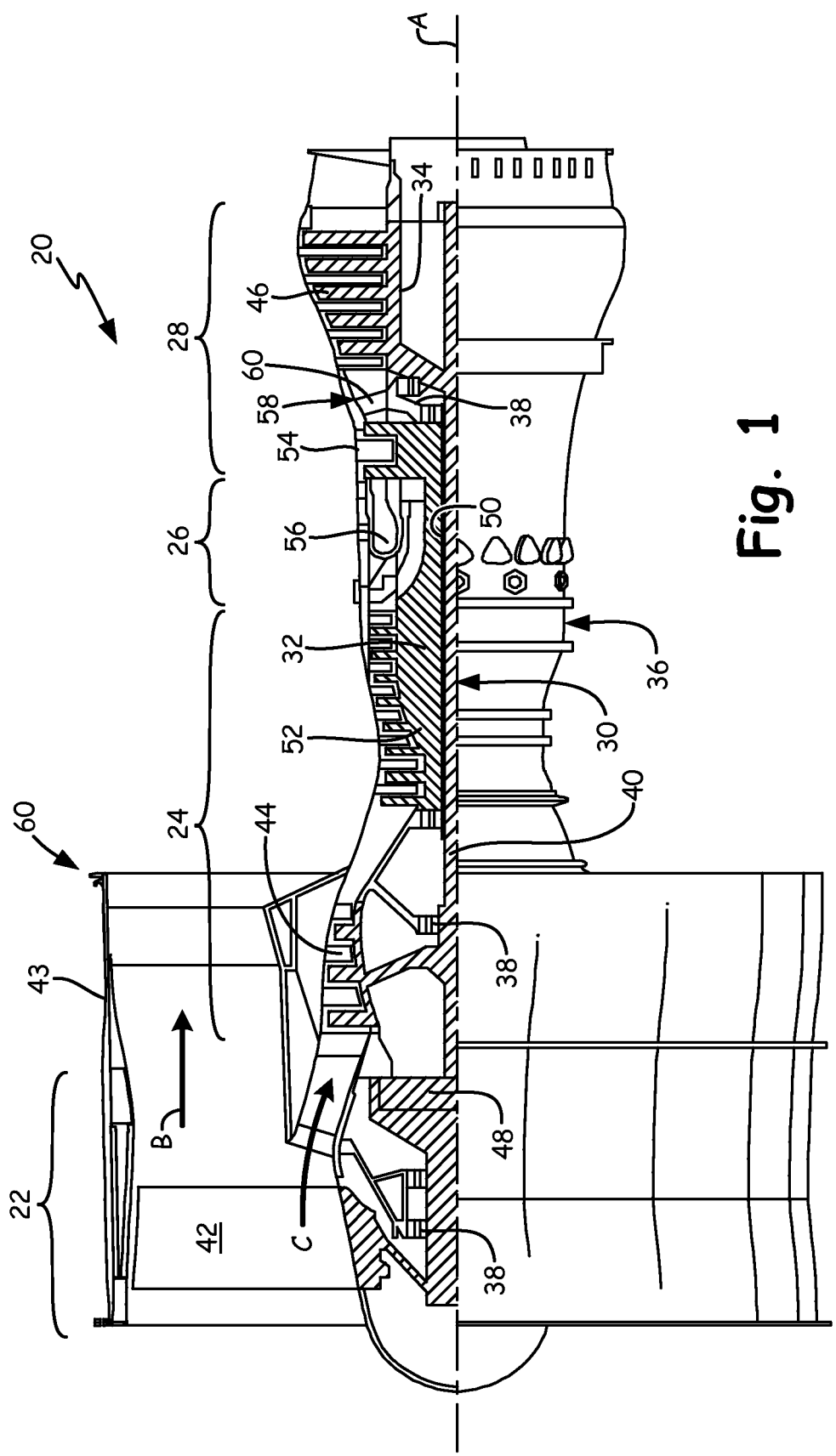
FIG. 1 schematically illustrates an example gas turbine engine that includes a fan section, a compressor section, a combustor section and a turbine section.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 and then by high pressure compressor 52, mixed with fuel and ignited in combustor 56 to produce high speed exhaust gases, and then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7°\ R]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about twenty-six fan blades and fan case 43 with V-groove 60 surrounding fan 42. In another non-limiting embodiment, fan section 22 includes less than about twenty fan blades. Moreover, in one disclosed embodiment low pressure turbine 46 includes no more than about six turbine rotors schematically indicated at 34. In another non-limiting example embodiment low pressure turbine 46 includes about three turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

In a turbofan engine, lighter components generally lead to more efficient performance. If less energy is expended moving internal engine parts, more energy is available for useful work. At the same time, the components themselves must be strong enough to withstand forces typical for the operating environment and performance envelope. Safety considerations based on the frequency and/or severity of possible failure will often dictate that the engine components also be able to withstand certain atypical, yet foreseeable events as well. Because stronger components are often heavier and/or more expensive, a balance must be struck between efficiency, safety, and cost.

Few locations in an aircraft are more representative of efforts to optimize the balance between efficiency, safety, and cost than engine 20. While lighter materials are preferable to improve efficiency, the high risk of severe consequences from engine damage will require that engine 20 be made of components having additional margins of safety. Fiber composites typically have low weight, and three-dimensional weaving of the composites can greatly increase strength in the thickness direction.

Figure 2A:
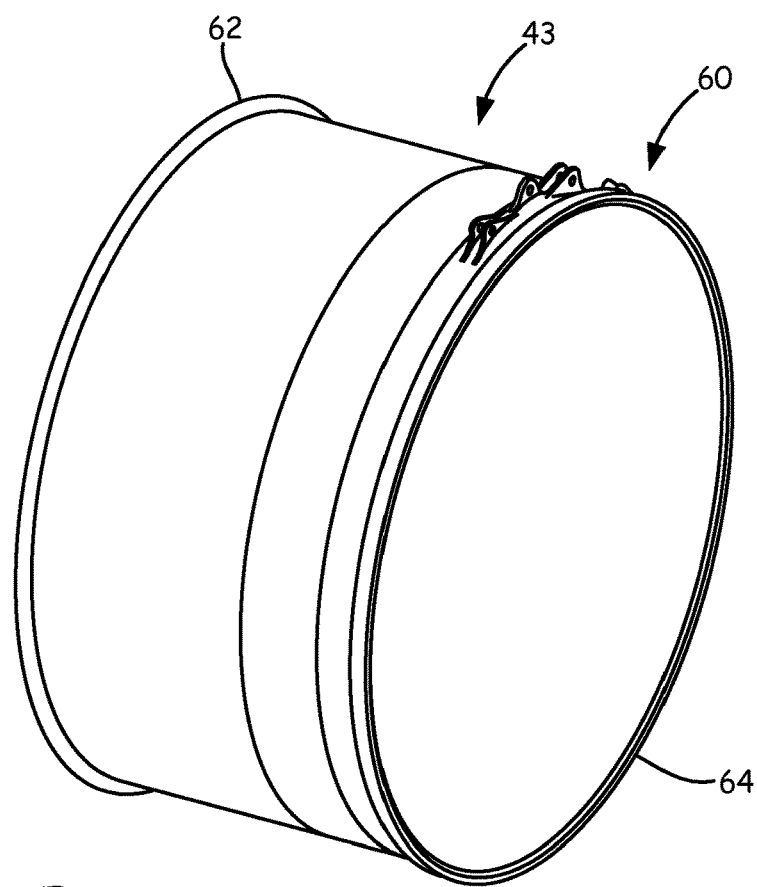
FIG. 2A is a perspective view of a Fan Case with a V-groove.
Figure 2B:
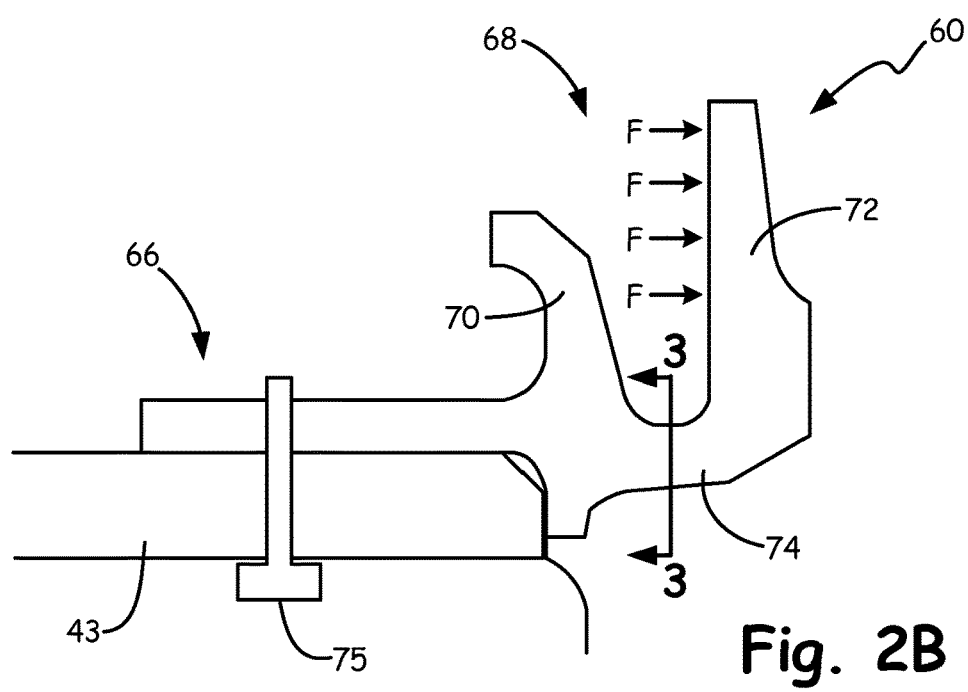
FIG. 2B is a cross-sectional view of the V-groove of FIG. 2A.

FIG. 2A is a perspective view of fan case 43 with attachment structure 60, and FIG. 2B is a cross-sectional view of attachment structure 60. FIGS. 2A-2B include fan case 43 with forward end 62 and aft end 64; and attachment structure 60, which includes connection ring 66 and V-groove 68 defined by arms 70, 72 and lower portion 74.

Connection ring 68 is connected to aft end 64 of fan case 43 with bolts 75. In alternative embodiments, attachment structure 60 can be formed integral to fan case 43 (see FIG. 1) and no fasteners are needed.

Attachment structure 60 is formed of composite materials, with at least portion formed of a three-dimensional weave. In the embodiment shown, lower portion 74 is a three-dimensional weave with arms 70, 72 and connection ring 68 formed of two-dimensional weaves. The two-dimensional weaves can be a plurality of stacked two-dimensional plies or fabric skins with elongated fibers extending through the plies at specified orientations. These can be stacked adjacent the three-dimensional weave portion 74 in a mold, injected with resin and then cured. Other embodiments could use preimpregnated composites, and/or could be formed with different methods. In other embodiments, three-dimensional weave extends into arm 70, arm 72, connection ring 68 and/or fan case 43.

When in engine 20, V-groove 68 is used to connect fan case 43 to other engine components, for example a thrust reverser. This connection puts force on arm 72 of attachment structure 60, as indicated by force arrows F, resulting in high axial forces in V-groove 68. In the past, V-grooves were made of high-strength metal to resist these forces. To reduce weight, composites can be used to form V-groove 60, replacing the heavier metal.

As V-groove 68 must withstand high axial loads, a typical two-dimensional composite could be subject to delamination, particularly in lower portion 74 of attachment structure 60. V-groove 68 includes a three-dimensional weave in lower portion 74 of attachment structure 60 to resist the high axial loads, increasing stiffness and strength in the thickness direction, thereby preventing delamination. By including a three-dimensional weave in parts of attachment structure 60, attachment structure can be made of light-weight materials while maintaining the required strength for connection to other engine components. A three-dimensional weave in certain parts of attachment structure 60 can also make the entire attachment structure 60 more resistant to damage and fatigue by increasing strength and inhibiting damage propagation.

Figure 3A:
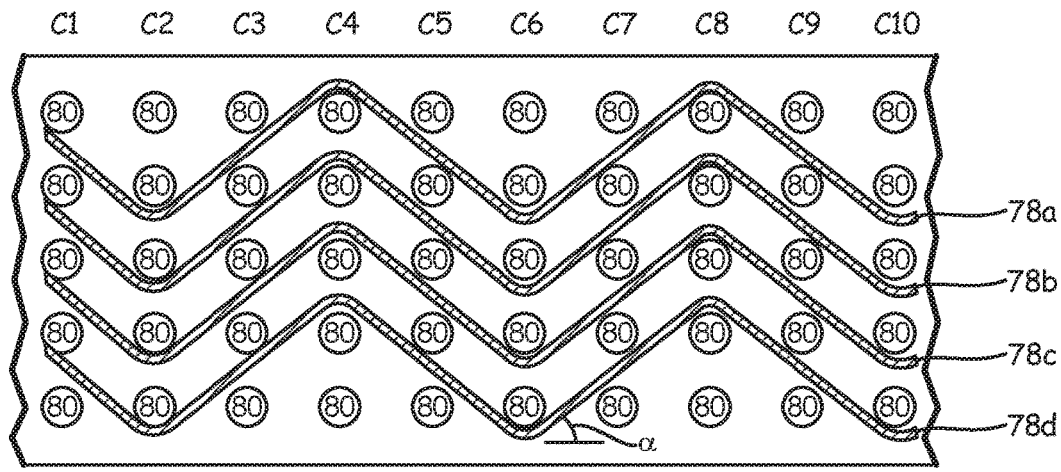
FIG. 3A is an enlarged cross-sectional view of an angle to angle interlock three-dimensional weave pattern for a V-groove.

FIG. 3A is an enlarged cross-sectional view at 3-3 of FIG. 2B, showing one plane of an angle to angle interlock three-dimensional weave pattern in attachment structure 60, and include tow yarns 78 ("tows") and warp yarns 80.

The yarns of attachment structure 60 are formed from bundles of fibers. Example fibers for the yarns of attachment structure 60 include but are not limited to graphite fibers, glass fibers, silicon carbide fibers and boron fibers and combinations thereof. Example resins for curing include but are not limited to epoxy resins and epoxy resins containing additives such as rubber particulates.

Figure 3B:
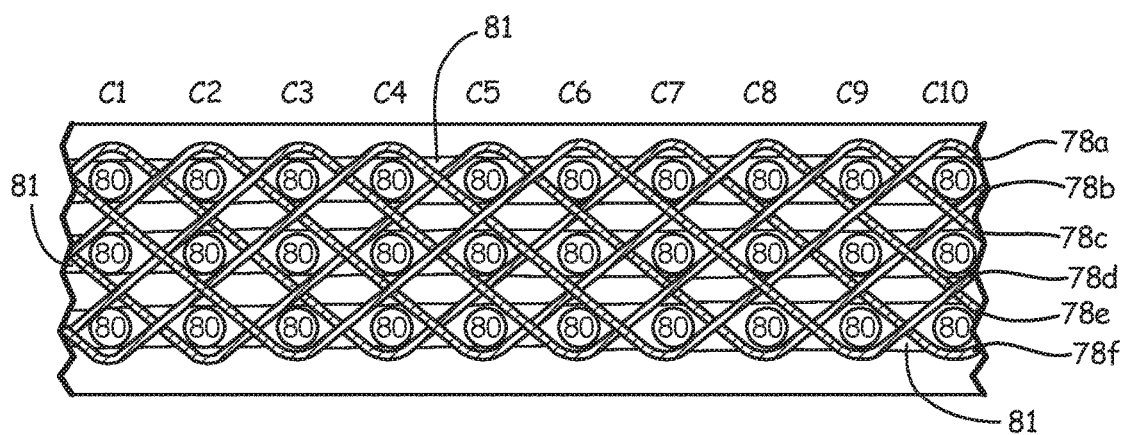
FIG. 3B is an enlarged cross-sectional view of a through-thickness three-dimensional weave pattern for a V-groove.

In the three-dimensional weave of FIG. 3A, warp yarns 80 intersect with other yarns (fill yarns (81), not shown in FIG. 3A, but shown in the embodiment of FIG. 3B) to form two-dimensional woven plies. Warp and fill yarns may be oriented at any in-plane angle. Tows 78a-78d (referred to collectively as tows or tow yarns 78) extend in the thickness direction of weave to interlock warp yarns 80 in an angle-to-angle interlock weave pattern. In the pattern shown, tow yarns 78 interlock with every second warp yarn 80. For example, tow 78a is woven from the top of the first warp yarn 80 from the top of column C4 to under the second warp yarn 80 in column C6 to over the first warp yarn 80 in column C8 over the length of five columns.

Because tow yarns 78 weave, they have crimp angles α and are not straight. Crimp angles α create chordwise undulations in tow yarns 78 and decrease the stiffness properties in that direction. The magnitude of crimp angle α affects the stiffness and strength properties in both the inplane and through-thickness directions. For example, a larger crimp angle results in a larger decrease in inplane strength and stiffness properties in that direction but provides a larger increase in through-thickness stiffness and strength properties.

Tow yarns 78 undulate over and under at least one layer of warp yarns 80 to hold adjacent two-dimensional weaves together, giving woven section 74 strength in the thickness direction. Tow yarns 78 do not go all the way through the thickness in an angle-to-angle interlock weave, instead gradually weaving layers together to form entire three-dimensional weave.

FIG. 3B is an enlarged cross-sectional view at 3-3 of FIG. 2B, showing a through-thickness three-dimensional weave pattern for an attachment structure 60, and include tows 78a-78f (collectively referred to as tows 78 or tow yarns 78) and warp yarns 80. As with FIG. 3A, tows 78 extend in the thickness direction and warp yarns 80 intersect with fill yarns (81) to form two-dimensional woven plies.

In a through-thickness weave pattern, as shown in FIG. 3B, tow yarns 78 extend the entire thickness of three-dimensional woven part 74, interlocking with the upper most and lower most warp yarns 80.

By including a three-dimensional weave in at least a portion of attachment structure 60, attachment structure 60 can be made of light-weight composite materials and still have the require strength to withstand through the thickness forces F in V-groove 68 when connecting fan case 43 to other engine components. Three-dimensionally woven portion of attachment structure 60 can help attachment structure 60 resist delamination that these forces F can cause in traditional two-dimensional woven composites by increasing interlaminar strength and stiffness.

While discussed as tow yarns 78 weaving together two-dimensional plies, in alternative embodiments, attachment structure 60 three-dimensional weave portion can be integrally woven as a single three-dimensional piece. Additionally, weave patterns shown in FIGS. 3A-3B are for example purposes only and can be varied depending on engine requirements.

An attachment structure for a fan case includes a V-groove defined by first and second arms extending circumferentially around the fan case and meeting at a lower portion, wherein at least a portion of the attachment structure is a three-dimensionally (3D) woven composite.

Additional and/or alternative embodiments include the lower portion of being made of the three-dimensionally woven composite; at least one of the arms being also made of the three-dimensionally woven composite; a connection portion extending outwards from the V-groove to connect to the fan case; the connection portion being integral to the fan case; the connection portion being a three-dimensionally woven composite; the three-dimensionally woven composite comprising an angle-to-angle interlock weave pattern; the three-dimensionally woven composite comprising a through-thickness weave pattern; and/or the entire attachment structure being a three-dimensionally woven composite.

A fan case includes a cylindrical portion with a first end and a second end; and an attachment structure on the second end with at least a portion comprising a three-dimensionally woven composite.

Additional and/or alternative embodiments include the attachment structure extending circumferentially radially outward around the second end; the attachment structure being shaped to connect the fan case to another engine component; the attachment structure having a V-groove shaped cross-section defined by first and second arms joined at a lower portion; the lower portion being a three-dimensionally woven composite; at least one of the first and second arms being a three-dimensionally woven composite; the attachment structure being connected to the cylindrical portion with fasteners; and/or the attachment structure being formed integral to the cylindrical portion.

A method of forming an attachment structure for a fan case includes three-dimensionally weaving at least a portion of an attachment structure; and connecting the attachment structure circumferentially around an end of the fan case.

Additional and/or alternative embodiments include the step of three-dimensionally weaving at least a portion of an attachment structure comprising through-thickness weaving at least a portion of the attachment structure; and/or the step of three-dimensionally weaving at least a portion of an attachment structure comprising angle-to-angle interlock weaving at least a portion of the attachment structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An attachment structure for an end of a fan case of an engine, the attachment structure comprising:
   a V-groove, configured to connect the fan case to other engine components, defined by first and second arms extending circumferentially around the case and meeting at a lower portion, wherein the first and second arms extend radially outward from the lower portion and the case, wherein at least a portion of the attachment structure is a three-dimensionally (3D) woven composite, and
   wherein the V-groove includes a three-dimensional weave in the lower portion of the attachment structure, wherein the weave comprises:
   warp yarns intersecting with fill yarns to form two-dimensional woven plies; and
   tows yarns extending in a thickness direction of the weave to interlock the warp yarns in an angle-to-angle interlock weave pattern, and
   wherein the tow yarns extend the entire thickness of the lower portion, interlocking with the upper most and lower most warp yarns.

2. The attachment structure of claim 1, wherein at least one of the arms is also made of the three-dimensionally woven composite.

3. The attachment structure of claim 2, and further comprising a connection portion extending outwards from the V-groove to connect to the case.

4. The attachment structure of claim 3, wherein the connection portion is a three-dimensionally woven composite.

5. The attachment structure of claim 1, wherein the entire attachment structure is a three-dimensionally woven composite.

6. A fan case of an engine, the fan case comprising:
a cylindrical portion with a first end and a second end; and
an attachment structure on the second end with at least a portion comprising a three-dimensionally woven composite, the attachment structure being configured to connect the fan case to other engine components, wherein the attachment structure has a V-groove shaped cross-section defined by first and second arms joined at a lower portion, wherein the first and second arms extend radially outward from both the lower portion and the second end.

7. The case of claim 6, wherein the attachment structure extends circumferentially around the second end.

8. The case of claim 6, wherein the lower portion is a three-dimensionally woven composite.

9. The case of claim 6, wherein at least one of the first and second arms is a three-dimensionally woven composite.

10. The case of claim 6, wherein the case is a fan case.

11. A method of forming an attachment structure for connecting a fan case to components of an engine, the method comprising:
three-dimensionally weaving a lower portion of a V-groove of the attachment structure,
wherein the weaving comprises:
intersecting warp yarns with fill yarns to form two-dimensional woven plies; and extending tow yarns in an angle-to-angle interlock weave pattern, wherein the tow yarns interlock with every second warp yarn; and
connecting the attachment structure circumferentially around an end of the case such that a first arm and a second arm of the V-groove extend radially outward from both the lower portion and the end of the case.

12. The method of claim 11, wherein the step of three-dimensionally weaving the lower portion of the V-groove comprises:
through-thickness weaving at least a portion of the attachment structure.

* * * * *